United States Patent
Jacobs

(10) Patent No.: US 10,750,823 B2
(45) Date of Patent: *Aug. 25, 2020

(54) METHOD FOR UNIFIED INFLATION AND SEALING

(71) Applicant: NIKE, Inc., Beaverton, OR (US)

(72) Inventor: Dale E. Jacobs, Beaverton, OR (US)

(73) Assignee: NIKE, INC., Beaverton, OR (US)

(*) Notice: Subject to any disclaimer, the term of this patent is extended or adjusted under 35 U.S.C. 154(b) by 36 days.

This patent is subject to a terminal disclaimer.

(21) Appl. No.: 15/577,218

(22) PCT Filed: May 17, 2016

(86) PCT No.: PCT/US2016/032831
§ 371 (c)(1),
(2) Date: Nov. 27, 2017

(87) PCT Pub. No.: WO2016/191146
PCT Pub. Date: Dec. 1, 2016

(65) Prior Publication Data
US 2018/0140046 A1    May 24, 2018

Related U.S. Application Data

(60) Provisional application No. 62/166,558, filed on May 26, 2015.

(51) Int. Cl.
*A43B 13/20* (2006.01)
*B29D 35/12* (2010.01)
(Continued)

(52) U.S. Cl.
CPC ............ *A43B 13/206* (2013.01); *A43B 13/20* (2013.01); *B29C 49/58* (2013.01); *B29D 35/122* (2013.01);
(Continued)

(58) Field of Classification Search
CPC ..... A43B 13/206; A43B 13/00; A43B 13/023; A43B 13/20; B29C 49/58; B29C 49/00;
(Continued)

(56) References Cited

U.S. PATENT DOCUMENTS 2,677,906 A   5/1954   Reed
4,049,854 A   9/1977   Casey et al.
(Continued)

FOREIGN PATENT DOCUMENTS

WO   0170060 A1   9/2001
WO   2009079073 A1   6/2009
WO   2016191146 A1   12/2016

OTHER PUBLICATIONS

International Preliminary Report on Patentability dated Dec. 7, 2017 in International Patent Application No. PCT/US2016/032831, 8 pages.
(Continued)

*Primary Examiner* — Michael N Orlando
*Assistant Examiner* — Abhishek A Patwardhan
(74) *Attorney, Agent, or Firm* — Shook, Hardy & Bacon L.L.P.

(57) ABSTRACT

A method for inflating a chamber in an article composed at least partially of polymer layers, such as thermoplastic layers. The method can allow for forming an aperture in a polymer layer, inflating a chamber or volume in fluid communication with the aperture, and then welding or sealing the chamber so that the inflation fluid is substantially retained in the chamber and/or does not escape via the aperture. In various aspects, the formation of the aperture, inflation of the chamber, and sealing of the chamber or aperture can be performed by a single tool and/or based on a single registration of the thermoplastic article with a tool. In some aspects, formation of the aperture is enabled in part
(Continued)

by using a punch with a cupped surface that allows the top layer of a thermoplastic article to be breached without forming a hole in at least one lower layer.

18 Claims, 10 Drawing Sheets

(51) Int. Cl.
  *B29C 49/58* (2006.01)
  *B29L 31/50* (2006.01)
  *B29K 75/00* (2006.01)
  *B29C 49/00* (2006.01)

(52) U.S. Cl.
  CPC ............... *B29C 2049/0057* (2013.01); *B29C 2049/5848* (2013.01); *B29C 2793/0081* (2013.01); *B29K 2075/00* (2013.01); *B29L 2031/504* (2013.01)

(58) Field of Classification Search
  CPC .... B29C 2049/0057; B29C 2049/0063; B29C 2049/5848; B29C 2793/00; B29C 2793/0018; B29C 2793/0081; B29C 2793/0045; B29D 35/122; B29D 35/12; B29D 35/14; B29D 35/142; B29D 35/00; B29L 2031/50; B29L 2031/504; B29K 2075/00; Y10T 156/107; Y10T 156/1052; Y10T 156/1056
  USPC .................................................. 156/145, 147
  See application file for complete search history.

(56) References Cited

U.S. PATENT DOCUMENTS

| | | | | |
|---|---|---|---|---|
| 6,102,156 | A | * | 8/2000 | Lipniarski ........... E04F 11/1043 182/115 |
| 2001/0042321 | A1 | * | 11/2001 | Tawney ................. A43B 13/20 36/29 |
| 2009/0151195 | A1 | * | 6/2009 | Forstrom ............... A43B 13/20 36/29 |
| 2012/0292829 | A1 | * | 11/2012 | Izquieta Anaut ...... A43B 13/04 264/512 |
| 2015/0107759 | A1 | * | 4/2015 | Poget ................... A24B 15/165 156/245 |

OTHER PUBLICATIONS

Communication under Rule 71(3) EPC dated Jan. 2, 2019 in European Patent Application No. 16725710.4, 39 pages.
Extended search report dated Sep. 24, 2019 in European Patent Application No. 19181010.0, 8 pages.

\* cited by examiner

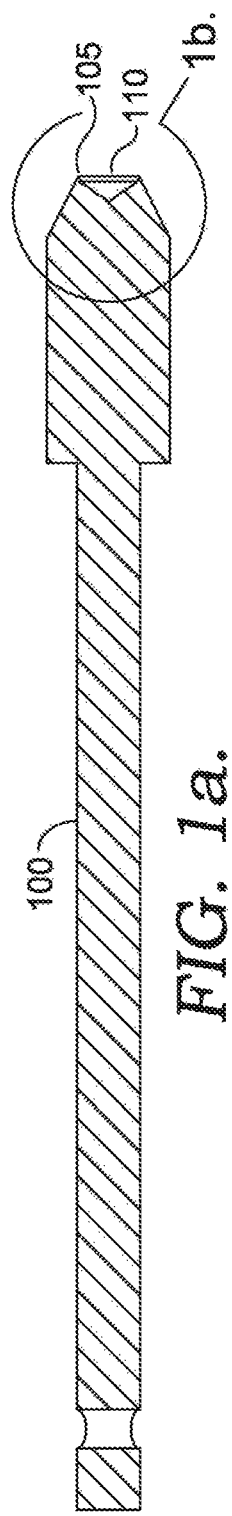
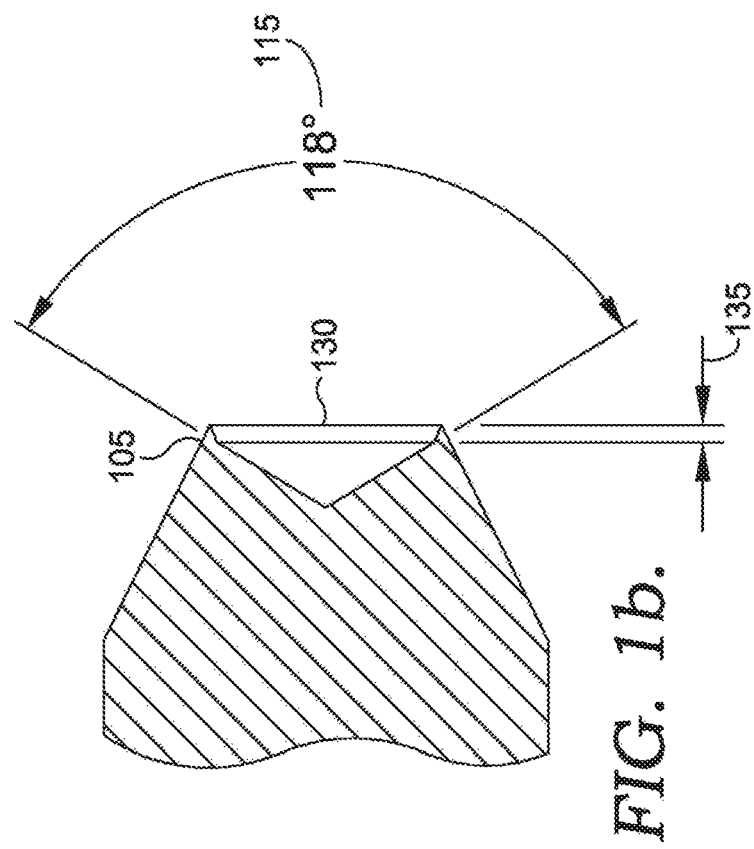
FIG. 1a.
FIG. 1b.

METHOD FOR UNIFIED INFLATION AND SEALING

CROSS-REFERENCE TO RELATED APPLICATIONS

This application claims priority under 35 U.S.C. § 371 to PCT/US2016/032831, filed on May 17, 2016, entitled "Method for Unified Inflation and Sealing," which claims priority to U.S. Provisional Patent Application No. 62/166,558, filed May 26, 2015, entitled "Method for Unified Inflation and Sealing," the entirety of the aforementioned applications is incorporated by reference herein.

FIELD OF THE INVENTION

A unified tool is provided for injecting a fluid into a volume within an article composed at least in part of polymer layers.

BACKGROUND OF THE INVENTION

Articles of footwear generally include two primary elements, an upper and a sole structure. The upper is formed from a variety of material elements (e.g., textiles, foam, leather, and synthetic leather) that are stitched or adhesively bonded together to form a void on the interior of the footwear for comfortably and securely receiving a foot. An ankle opening through the material elements provides access to the void, thereby facilitating entry and removal of the foot from the void. In addition, a lace is utilized to modify the dimensions of the void and secure the foot within the void.

The sole structure is located adjacent to a lower portion of the upper and is generally positioned between the foot and the ground. In many articles of footwear, including athletic footwear, the sole structure conventionally incorporates an insole, a midsole, and an outsole. The insole is a thin compressible member located within the void and adjacent to a lower surface of the void to enhance footwear comfort. The midsole, which may be secured to a lower surface of the upper and extends downward from the upper, forms a middle layer of the sole structure. In addition to attenuating ground reaction forces (i.e., providing cushioning for the foot), the midsole may limit foot motions or impart stability, for example. The outsole, which may be secured to a lower surface of the midsole, forms the ground-contacting portion of the footwear and is usually fashioned from a durable and wear-resistant material that includes texturing to improve traction.

The conventional midsole is primarily formed from a foamed polymer material, such as polyurethane or ethylvinylacetate, that extends throughout a length and width of the footwear. In some articles of footwear, the midsole may include a variety of additional footwear elements that enhance the comfort or performance of the footwear, including plates, moderators, fluid-filled chambers, lasting elements, or motion control members. In some configurations, any of these additional footwear elements may be located between the midsole and either of the upper and outsole, embedded within the midsole, or encapsulated by the foamed polymer material of the midsole, for example. Although many conventional midsoles are primarily formed from a foamed polymer material, fluid-filled chambers or other non-foam structures may form a majority of some midsole configurations.

Various techniques may be utilized to form fluid-filled chambers for articles of footwear or other products, including a two-film technique, a thermoforming technique, and a blowmolding technique, for example. In the two-film technique, two separate polymer sheets are bonded together at specific locations. The thermoforming technique is similar to the two-film technique in that two polymer sheets are bonded together, but also includes utilizing a heated mold to form or otherwise shape the polymer sheets. In the blowmolding technique, a parison formed from a molten or otherwise softened polymer material is placed within a mold having a cavity with the desired configuration of the chamber. Pressurized air induces the polymer material to conform with surfaces of the chamber. The polymer material then cools and retains the shape of the cavity, thereby forming the chamber.

Following each of the techniques discussed above, the chambers are pressurized. That is, a pressurized fluid is injected into the chambers and then sealed within the chambers. One method of pressurization involves forming inflation conduits in residual portions of the polymer sheets or the parison. In order to pressurize the chambers, the fluid is injected through the inflation conduits, which are then sealed. The residual portions of the polymer sheets or the parison, including the inflation conduits, are then trimmed or otherwise removed to substantially complete manufacture of the chambers.

U.S. Pat. No. 8,241,450 describes a method for inflating a fluid filled chamber. After defining a first surface, a second surface, and a sidewall surface of a chamber, an aperture can be defined through the first surface in a location where the first surface is spaced from the second surface. A pressurization apparatus can then be located adjacent to the first surface and around the aperture. The pressurization apparatus can be utilized to inject a fluid into the chamber through the aperture, compress the first surface against the second surface, and form a bond around the aperture and between the first surface and the second surface.

SUMMARY OF THE INVENTION

In various aspects, a method for introducing fluid into a sealed volume is provided. The method includes contacting a first layer of an article with a pressurization conduit, the pressurization conduit having an inner perimeter and an outer perimeter, the inner perimeter defining a conduit volume; forming an aperture in the first layer of the article with a punch, at least a portion of the punch being within the conduit volume, the conduit volume being in fluid communication with a first volume in the article via the aperture in the first layer; injecting one or more fluids from the conduit volume into the first volume via the aperture in the first layer to generate a first pressure; compressing, using the pressurization conduit, at least a portion of the first layer of the article against at least a portion of the second layer of the article; and forming a bond between the first layer of the article and the second layer of the article, the bond being formed around the aperture in the first layer, wherein the punch comprises a punch head, the punch head comprising a punch edge defining a perimeter, a surface of the punch within the circumference being concave and defining a punch volume, an average depth of the punch volume being less than a thickness of the first layer.

Optionally, at least one fluid can be introduced into the conduit volume prior to forming the aperture in the first layer to generate a conduit pressure. In such an aspect, one option is to form the aperture in the first layer in a portion of the first layer exposed to the conduit pressure, the conduit pressure being maintained on the portion of the first layer exposed to the conduit pressure from forming the aperture in the first layer to forming the bond around the aperture in the first layer. Additionally or alternately, introducing the at least one fluid into the conduit volume can include introducing a fluid into the conduit volume to generate an intermediate pressure, forming a seal between the conduit and the first layer, and introducing a fluid to generate the conduit pressure.

In aspects where at least one fluid is introduced into the conduit volume prior to forming the aperture in the first layer to generate a conduit pressure, various options can be used alone or in combination to define a relationship between the conduit pressure and a pressure outside of the pressurization conduit. For example, the conduit pressure can be greater than a pressure outside of the pressurization conduit during the injecting of the one or more fluids. Another option is that the conduit pressure can be continuously greater than a pressure outside of the pressurization conduit during the method from the step of forming of the aperture in the first layer to the step of forming of the bond around the aperture. Still another option is that at least a portion of the first layer can be continuously exposed to the conduit pressure from the forming of the aperture in the first layer to the forming of the bond around the aperture, the conduit pressure being greater than a pressure outside of the pressurization conduit. Any of the above options can be used alone or in combination, such as having two or more of the above options for defining the relationship, or having all of the above options for defining the relationship.

In any of the above aspects where a conduit pressure is greater than a pressure outside of the pressurization conduit, the conduit pressure can be greater than a pressure outside of the pressurization conduit by at least about 1 psi (6.9 kPa). For example, the conduit pressure can be greater than a pressure outside of the pressurization conduit by about 3 psi (20.7 kPa) to about 100 psi (690 kPa), or about 3 psi to about 50 psi (345 kPa), or about 5 psi (34.5 kPa) to about 100 psi, or about 5 psi to about 50 psi.

For example, in an aspect where the conduit pressure in greater than a pressure outside of the pressurization conduit by about 3 psi (20.7 kPa) to about 100 psi (690 kPa), this can correspond to the conduit pressure being greater than the pressure outside of the pressurization conduit during injecting of the one or more fluids; and/or this can correspond to the conduit pressure being continuously greater than the pressure outside of the pressurization conduit during the method from the (step of) forming of the aperture in the first layer to the (step of) forming of the bond around the aperture; and/or this can correspond to the at least a portion of the first layer being continuously exposed to the conduit pressure from the forming of the aperture in the first layer to the forming of the bond around the aperture. These various optional aspects are also explicitly contemplated in conjunction with the other ranges described herein for the conduit pressure being greater than a pressure outside of the pressurization conduit.

Additionally or alternately, a method according to any of the above aspects can include maintaining contact between the pressurization conduit and the first layer from the (step of) forming the aperture in the first layer to the (step of) forming the bond around the aperture in the first layer.

Additionally or alternately, in the method of any of the above aspects, the punch volume can be a conical volume, a conical frustum volume, an n-sided pyramidal volume where n is greater than or equal to three, or a frustum volume based on an n-sided pyramidal volume where n is greater than or equal to three. Optionally, for an n-sided pyramidal volume or a frustum based on an n-sided pyramidal volume, n can be twenty or less, or twelve or less. Additionally or alternately, in the method of any of the above aspects, an included angle at opposing points of the circumference of the punch can be about 110° to 160°. For example, the included angle at opposing points of the circumference can be about 120° to about 160°, or 120° to about 150°, or about 135° to about 160°, or about 135° to about 150°.

Additionally or alternately, in the method of any of the above aspects, the average depth of the punch volume can be about 0.2 to about 0.75 times an average diameter of the perimeter of the punch edge. For example, the average depth can be about 0.2 to about 0.5 times an average diameter of the perimeter of the edge, or about 0.25 to about 0.75 times, or about 0.25 to about 0.5 times, or about 0.4 to about 0.75 times.

Additionally or alternately, in the method of any of the above aspects, during the forming of the bond around the aperture in the first layer, the aperture in the first layer can be adjacent to a portion of the second layer that does not include an aperture.

Additionally or alternately, in the method of any of the above aspects, the pressurization conduit can include an electrode. In this type of optional aspect, forming the bond around the aperture can include forming the bond with radio frequency energy.

Additionally or alternately, in the method of any of the above aspects, the first layer, the second layer, or both the first layer and the second layer are a thermoplastic polymer, a thermoplastic urethane, a polyurethane, a polyester, a polyester polyurethane, a polyether polyurethane, a polyester polyol, or a combination thereof.

Additionally or alternately, in the method of any of the above aspects, the conduit pressure can be about 18 psia (124 kPaa) to about 115 psia (793 kPaa), or about 20 psia (138 kPaa) to about 115 psia.

Additionally or alternately, in the method of any of the above aspects, the pressure within the fluid-receiving volume after forming the bond around the aperture can be about 18 psia (124 kPaa) to about 115 psia (793 kPaa), or about 20 psia (138 kPaa) to about 115 psia.

Additionally or alternately, in the method of any of the above aspects, the first pressure can be about 51 psia (350 kPaa) or less, or at least about 14.5 psia (100 kPaa), or about 100 kPaa to about 350 kPaa.

BRIEF DESCRIPTION OF THE DRAWING

FIGS. 1a and 1b show examples of a punch according to an aspect of the disclosure.

DETAILED DESCRIPTION OF THE INVENTION

Overview

Figure 2:
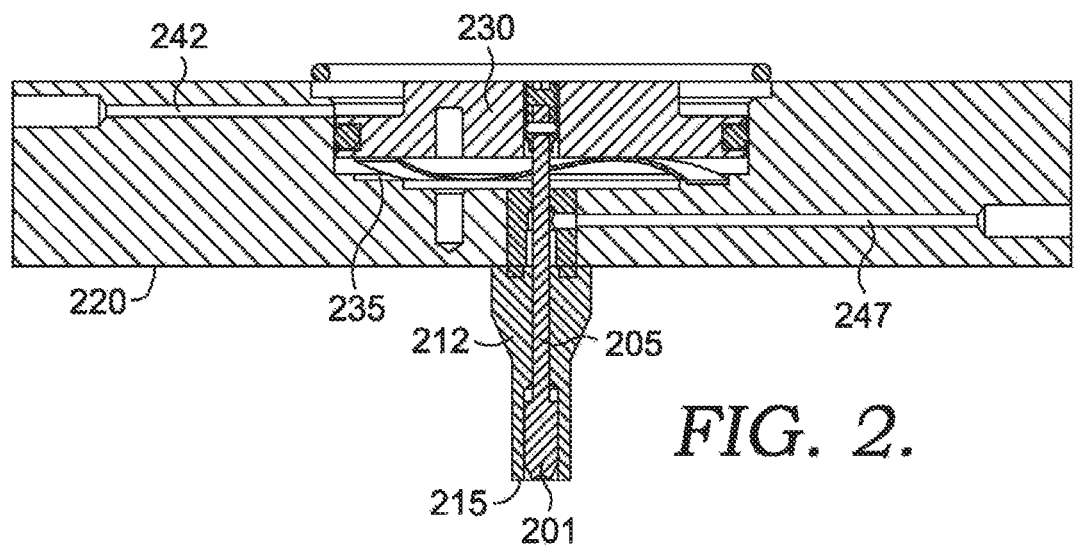
FIG. 2 shows an example of a tool according to an aspect of the disclosure.

In various aspects, systems and methods are provided for inflating a chamber in an article composed at least partially of polymer layers, such as thermoplastic layers. The systems and methods can allow for forming an aperture in a polymer layer, inflating a chamber or volume in fluid communication with the aperture, and then welding or sealing the chamber so that the inflation fluid is substantially retained in the chamber and/or does not escape via the aperture. In various aspects, the formation of the aperture, inflation of the chamber, and sealing of the chamber or aperture can be performed by a single tool and/or based on a single registration of the thermoplastic article with a tool. By forming an aperture, inflating a volume, and sealing the volume with a single tool and/or single registration of the article with a tool, one or more potential manufacturing benefits can be obtained, such as a reduced time of manufacture, a simplified manufacturing process flow, increased time between maintenance cycles, and/or a reduction in manufacturing defects in the thermoplastic articles. In some aspects, formation of the aperture is enabled in part by using a punch with a cupped surface that allows the top layer of a thermoplastic article to be breached without forming a hole in at least one lower layer. Additionally, the cupped aperture surface can allow the remnant of material originally associated with the aperture location to remain with the thermoplastic article. This avoids an accumulation of remnant pieces in or on the tooling.

Polymer or plastic articles with fluid-filled chambers (including thermoplastic articles) can be used to form a variety of products. Footwear products that may include fluid-filled chambers include, but are not limited to, athletic footwear styles such as running shoes, basketball shoes, cross-training shoes, football shoes, golf shoes, hiking shoes and boots, ski and snowboarding boots, soccer shoes, tennis shoes, and walking shoes, for example. Fluid-filled chambers may also be utilized with footwear styles that are generally considered to be non-athletic, including dress shoes, loafers, and sandals. In addition to footwear, fluid-filled chambers may be incorporated into other types of apparel and athletic equipment, including helmets, gloves, and protective padding for sports such as football and hockey. Similar chambers may also be incorporated into cushions and other compressible structures utilized in household goods and industrial products. Accordingly, chambers formed using systems and methods that incorporate the concepts disclosed herein may be used to manufacture a variety of products.

Forming a fluid-filled chamber in an article composed of polymer layers can generally involve at least three processes. First, an aperture for allowing fluid to be passed into the chamber can be defined or created, such as by punching through a wall of the chamber. Second, the fluid can be injected into the chamber. Finally, the chamber can be sealed (such as by closing the aperture) so that the fluid is retained within the chamber of the thermoplastic article.

One option for performing the above processes is to use a separate tool for each process. Regardless of whether a tool is moved to the article or whether the article is moved to a tool, a registration or alignment process is typically required after each movement of a tool or the article. During aperture formation, the registration process can allow the aperture to be formed in a location that provides fluid communication with the desired chamber. After aperture formation, the registration process(es) allow the existing aperture to be aligned with the tool for filling the chamber and/or the tool for sealing the chamber. During a manufacturing process, each registration process requires additional time and possibly equipment. As a result, reducing or minimizing the number of alignment or registration processes can reduce manufacturing time and costs.

One option for reducing the number of registration processes is to use a single tool to perform more than one task. For example, a single tool could be used for forming the aperture and filling the chamber. However, conventional methods for using a single tool for both aperture formation and chamber filling have presented a variety of problems. Some problems have been related to the excess material formed when an aperture is formed in a polymer layer. Typically, the article initially has a continuous, closed exterior surface. At least this exterior surface is punched, punctured or otherwise breached to form an aperture for injection of fluid. If this aperture is formed by a physical method (such as by use of a mechanical punch), a piece of polymer material of roughly the size of the aperture will also be formed. For an aperture formed using a conventional needle-type punch, this excess piece of polymer material will often become detached from the main article. These excess pieces of polymer material can present difficulties for a manufacturing process flow. The excess polymer material pieces can potentially accumulate and foul the equipment used for the manufacturing flow. Additionally or alternately, the excess polymer material pieces may settle or lodge on other articles during manufacture. This can lead to formation of defects on the exterior of the articles, potentially reducing or minimizing the commercial value of the articles. Avoiding such fouling and defects can require increased downtime due to increased numbers of maintenance and cleaning events.

In order to overcome one or more of the above problems, the systems and methods provided herein allow for forming a fluid-filled chamber in an article composed at least in part of polymer layers while reducing or minimizing the number of tools and/or registration processes involved. The methods are enabled in part by use of a punch tool with a concave cupped surface, so that pieces of excess polymer material are not created during formation of the aperture. After forming the aperture, the punch can then be withdrawn to allow the same tool to dispense the fluid into the chamber. The tool can then be used as a radio-frequency (RF) welding tool to seal the chamber (such as by closing the aperture), thus retaining the fluid in the chamber. This allows the fluid-filled chamber to be formed using a single tool and/or with a reduced or minimized number of registration or alignment processes.

Formation of an Aperture

In various aspects, a single tool can be used to form an aperture in an article; inject or inflate a volume within the article with a fluid; and then seal the article so that the fluid does not escape through the aperture.

A variety of polymer materials may be utilized for the layers of the article and/or for the portion of the article that is subject to formation of an aperture and injection with a pressurized fluid. In selecting a polymer material for the article, engineering properties of the polymer material (e.g., tensile strength, stretch properties, fatigue characteristics, dynamic modulus, and loss tangent) as well as the ability of the material to limit the diffusion of the fluid contained within a volume in the article may be considered. When formed of thermoplastic urethane, for example, the polymer material of the article may have a thickness of approximately 0.89 millimeter, but the thickness may range from 0.25 to 4.0 millimeters or more, for example. In addition to thermoplastic urethane, examples of polymer materials that may be suitable for the article include polyurethane, polyester, polyester polyurethane, polyether polyurethane, and polyurethane including a polyester polyol. Accordingly, a variety of polymer materials may be utilized for the thermoplastic article.

Formation of an aperture can begin by contacting a layer of the article with a surface of a tool. The surface of the tool can be an outer annulus or other rim for a pressurization conduit. The pressurization conduit can be a tube or other conduit that is fixed to a base for the tool on one end. The end of the conduit that contacts the surface of the article can be an open end, to allow fluid communication between the conduit and the layer of the article and/or an aperture created in the layer. The contact between the surface of the tool and the surface of the article can be sufficient to allow a pressure greater than ambient to be maintained within the volume of the tube relative to the exterior of the tube. In some aspects, the conduit can also serve as an electrode that is suitable for delivery of radio frequency (RF) energy to allow for RF welding of layers of the article after injection of fluid. For example, the pressurization conduit can be constructed of a metal with sufficient conductivity to allow for delivery of the RF energy. Examples of suitable materials for the tube can include brass or aluminum. Optionally, the initial contact between the surface of the tool and the layer of the article can be sufficient to allow for RF welding, or additional pressure can be applied by the tool after formation of the aperture or after injection of the fluid and prior to performing RF welding.

Contacting the surface of the pressurization conduit with the layer of the article can allow an elevated pressure to be maintained within the volume in the conduit. In some aspects, the pressure within the conduit can be about 1 psi (6.9 kPa) to about 100 psi (690 kPa) greater than the pressure outside the conduit. For example, a pressure within the conduit can be at least about 1 psi (6.9 kPa) greater than the pressure outside the conduit, or at least about 3 psi (20.7 kPa) greater, or at least about 5 psi (34.4 kPa) greater, or at least about 10 psi (68.9 kPa) greater. Additionally or alternately, the pressure within the conduit can be about 100 psi (690 kPa) greater than the pressure outside the conduit, or about 50 psi (345 kPa) greater. Each of the above lower bound values is explicitly contemplated in combination with each of the above upper bound values. This pressure differential relative to the exterior of the pressure conduit can be maintained during any or all convenient portions of the processes of forming an aperture, injecting a fluid, and sealing the aperture. In some aspects, the layer of the thermoplastic article in which the aperture is formed can be exposed to the higher pressure within the conduit (i.e., the pressure differential) during any or all convenient portions of the processes of forming an aperture, injecting a fluid, and sealing the aperture.

The pressure differential between the interior volume of the pressurization conduit and the exterior of the pressurization conduit may vary during the processes, but a desired differential corresponding to one of the above differential pressure values can optionally be maintained during some or all of the processes. As an example, the pressure differential between the conduit pressure (inside the conduit) and a pressure outside of the pressurization conduit can be at least about 3 psi (20.7 kPa), or another of the differential values noted above, during the injecting of one or more fluids into the chamber or other volume receiving a fluid. Additionally or alternately, such a pressure differential can be maintained continuously from the forming of the aperture in the thermoplastic layer until the bond is formed to seal the chamber that receives the fluid. In some aspects, the pressure within the pressurization conduit during one or more of the processes, or during all of the processes, can be about 15 psia (103 kPaa) to about 115 psia (793 kPaa). For example, the pressure with the pressurization conduit during one or more of the processes, or during all of the process, can be at least about 15 psia (103 kPaa), or at least about 16 psia (110 kPaa), or at least about 18 psia (124 kPaa), or at least about 20 psia (138 kPaa), and optionally up to 115 psia (793 kPaa) or less. As noted above, the layer of the thermoplastic article in which the aperture is formed can similarly be exposed to the higher pressure within the conduit (i.e., the pressure differential) during these portions of the process.

A punch located within the tube can then be used to form the aperture in the surface of the thermoplastic article. One option can be to manually drive the punch toward the thermoplastic article. In some aspects, the punch can be driven by a repeatable and/or automatic process, such as by an actuator. For example, the punch can be driven toward the surface of the article using a pneumatic cylinder, such as a single-acting pneumatic cylinder. In a single-acting pneumatic cylinder, a pressurized gas (such as air or nitrogen) can be used to exert a force on a cylinder that is coupled to the punch. After deploying the punch to create the aperture, the pressure can be released. For a single-acting cylinder, the cylinder can then be returned to the initial position by a mechanical means, such as using a spring. For example, driving the cylinder can compress a wave spring that can then expand to return the cylinder to the initial position. Alternatively, a spring mechanism that becomes extended when the cylinder is moved can also be used to return the punch to the initial position. Of course, other types of actuators, such as double-acting pneumatic cylinders or other mechanical or electromagnetic actuators, can also be used to control the punch.

After forming the aperture, the punch is withdrawn from the aperture such as by use of a spring mechanism as described above. A fluid can then be injected into a volume in the article by passing the fluid from the conduit and into the volume via the aperture. The fluid can be delivered into the conduit from a fluid source, such as a pressurized nitrogen or pressurized air source. The fluid can pass around the punch in the conduit due to a clearance distance between the punch and the inner perimeter of the conduit. The clearance distance at all locations within the conduit can be about 0.0025 inches (0.064 mm) to about 0.012 inches (0.30 mm). For example, the clearance between the punch and the inner perimeter of the conduit can be at least about 0.0025 inches (0.064 mm) at all locations within the conduit, or at least about 0.004 inches (0.10 mm) or at least about 0.005 inches (0.13 mm). Additionally or alternately, the clearance between the punch and the inner perimeter of the conduit can be about 0.012 inches (0.30 mm) or less, such as about 0.010 inches (0.25 mm) or less. Each of the above lower bound values is explicitly contemplated in combination with each of the above upper bound values. The clearances for the punch within the pressurization conduit can allow the punch to remain sufficiently aligned while maintaining an acceptable pressure drop between the fluid source and the open (exit) end of the pressurization conduit.

It is noted that the inner perimeter or circumference of the pressurization conduit may vary along the height of the conduit. For example, it may be desirable to have a punch head with a larger cross section than the remaining portion of the punch. In order to reduce the volume of gas required to maintain pressure within the pressurization conduit, the conduit can be shaped to have the desired clearance with the punch in the first position. Thus, the inner perimeter or circumference of the conduit can be narrower for the main body of the punch, with the conduit broadening to a larger inner perimeter or circumference to accommodate the punch head. When the punch is deployed (such as to the second position) to form an aperture, the punch head will move out of the conduit, resulting in addition clearance between a portion of the punch and a portion of the inner perimeter of the conduit. However, during most of the operation of the tool, the punch will be substantially within the conduit. The outer perimeter of the conduit can have similar variations in size along the length of the conduit. Of course, the inner perimeter and/or outer perimeter of the conduit can also be varied for any other convenient reason along the length of the conduit.

The pressurized fluid delivered into the volume within the article can be any convenient fluid. For example, the pressurized fluid can be a pressurized gas such as nitrogen or air. More generally, the fluid delivered into the volume in the thermoplastic article may range in pressure from about zero to about three-hundred-fifty kilopascals (i.e., approximately fifty-one pounds per square inch) or more. For example, the resulting pressure in the volume receiving the fluid can be at least about 100 kPaa, such as about 100 kPaa to about 350 kPaa. In addition to air and nitrogen, the fluid delivered into the volume may include octafluorapropane and/or any of the gasses disclosed in U.S. Pat. No. 4,340,626 to Rudy, such as hexafluoroethane and sulfur hexafluoride. In some configurations, the volume containing the pressurized fluid may be incorporated into a fluid system, as disclosed in U.S. Pat. No. 7,210,249 to Passke, et al., as either a pump chamber or a pressure chamber. In some configurations, the volume containing the pressurized fluid may incorporate a valve that permits the individual to adjust the pressure of the fluid within the volume. It is noted that the fluid used to initially pressurize the conduit prior to forming the aperture does not have to be identical to the fluid that is passed via the aperture into the volume within the article.

In various aspects, separate fluid sources can be used to provide fluid for a pneumatic cylinder and the fluid for the pressurization conduit. For example, a suitable pressure for a pneumatic cylinder can range from about 50 psig (345 kPag) to about 120 psig (827 kPag). By contrast, the desired pressure for the pressurization conduit can be about 100 psig (690 kPag) or less, or 50 psig (345 kPag) or less, down to a pressure just above ambient such as 1 psig (7 kPag), which might correspond to an absolute pressure of 15 psia (103 kPaa) or 16 psia (110 kPaa). As a result, in some aspects the fluid delivery conduit for the pressurization conduit may not be in fluid communication with the fluid delivery conduit for the pneumatic cylinder.

Based on the elevated pressure within the volume in the conduit, the interior of the article is not exposed to the outside atmosphere. Instead, the pressurized fluid within the conduit can be injected into one or more volumes that are in fluid communication with the tool via the aperture. In some aspects, the punch can form an aperture in fewer than all of the layer of the article, such as forming an aperture only in an upper and/or first layer of the article while leaving one or more lower layers intact.

After forming the aperture, the tool can be used to seal the volume(s) in the thermoplastic article so that the pressurized fluid is retained within the volume(s). This can be achieved by sealing the aperture or by sealing any other convenient location in the thermoplastic article that retains at least a majority of the pressurized fluid. One option for sealing the volume(s) is to perform radio frequency (RF) welding on the article. RF welding of plastic layers to form a substantially air-tight seals is a well-known process. The contact of the conduit with the surface of the article can provide the necessary force (pressure) for maintaining contact of two (or more) plastic layers during welding. In some aspects, the conduit can serve as an electrode, so that the RF energy for welding can be delivered by the conduit to the layers of the article for heating of the layers. The RF energy can then heat the plastic layers to form a bond that substantially prevents the fluid that was injected into the volume from escaping from the volume.

Tool for Formation of an Aperture

In various aspects, a single tool can be used to form an aperture in an article; load or inflate a volume within the article with a fluid; and then seal the article so that the fluid does not escape through the aperture.

To facilitate formation of an aperture, the tool can include an outer tube or conduit for contacting a surface and an internal punch for forming the aperture. In some aspects, the tube or conduit can have an annular shape. In other aspects, the conduit can have an elliptical or substantially elliptical shape. A substantially elliptical shape refers to a shape that can vary from an elliptical shape by up to 10% of a minor or major axis value at any location on the ellipse. Of course, a circular shaped conduit (an annulus) is merely a special case of an ellipse. In various aspects, the axis of movement for the internal punch can be concentric or substantially concentric with a central axis of the conduit. In some aspects, the tip of the punch or punch head (the end that contacts the polymer layer) can include an edge, with the edge defining the perimeter of a cupped or concave portion of the punch head surface. Optionally, the edge defining the cupped portion of the surface can have a sufficiently sharp edge to facilitate forming an aperture.

The cupped portion of the punch surface can define a conical shape, an n-sided pyramidal shape (where n is greater than or equal to three, optionally twenty or less, or twelve or less), a frustum volume of such a conical or n-sided pyramidal shape, or a volume section of an ovoid or spheroid shape. In some aspects, the volume defined by the cupped portion (the punch volume) is a shallow volume relative to the diameter of the base of the cupped portion (which corresponds to the shape defined by the edge).

As an example, the average depth of the cupped portion (punch depth) can be less than the average distance defined by the two opposing points of the edge that defines the base of the cupped portion (an average diameter), such as having an average depth of the cupped portion that is less than 0.75 times the average diameter of the base, or less than about 0.5 times the average diameter, or less than about 0.4 times the diameter. Additionally or alternately, the depth of the cupped portion (punch depth) can be at least about 0.2 times the average diameter of the base, such as at least about 0.25 times the average diameter, or at least about 0.4 times the average diameter, or at least about 0.5 times the average diameter. Examples of average depth ranges include, but are not limited to, 0.2 times to 0.75 times the average diameter of the base, or 0.2 times to 0.5 times, or 0.2 times to 0.4 times, or 0.25 times to 0.75 times, or 0.25 times to 0.5 times, or 0.25 times to 0.4 times, or 0.4 times to 0.75 times, or 0.4 times to 0.5 times, or 0.5 times to 0.75 times.

In some additional and/or alternative aspects, the depth of the cupped portion of the punch can be selected based on the thickness of a surface or layer of the article where the aperture is formed. In order to be effective for opening an aperture, the depth of the cupped portion can be at least about the thickness of the layer, such as about 1.0 times the thickness of the layer to about 3.0 times the thickness of the layer. For example, the depth of the cupped portion can be at least about 1.0 times the thickness of the layer or at least about 1.5 times the thickness of the layer. Additionally or alternatively, the depth of the cupped portion can be about 3.0 times the thickness of the layer or less, such as about 2.5 times the thickness of the layer or less, or about 2.0 times the thickness of the wall or less, or about 1.6 times the thickness of the wall or less. Each of the above lower bound values is explicitly contemplated in combination with each of the above upper bound values. Such values for the depth of the cupped portion can be suitable for causing the remnant of material formed after opening the aperture to remain with the thermoplastic article.

In some further additional and/or alternative aspects, for cupped portions corresponding to a conical, pyramidal, or frustum volume, the shallow nature of the cupped portion relative to the diameter of the punch surface can be defined based on the angle of the walls of the cupped surface relative to the edge that defines the cupped surface. If the wall of the cupped portion were aligned with the long axis of the punch, the angle between the wall and the flat rim would be 90 degrees. In the limit of an angle of 180 degrees, the cupped portion would be eliminated and instead the surface of the punch would be a flat plane. In various aspects, the angle defined by the walls of the cupped portion can be greater than 110 degrees, or at least 120 degrees, or at least 135 degrees, and/or optionally less than 160 degrees, or less than 150 degrees.

FIGS. 1a and 1b show an example of a side cutaway view of a punch 100 having an edge 105 that defines a cupped portion 110 of the surface that has a volume 130. As shown in FIG. 1b, the angle 115 defined by the cupped portion 110 can be an angle between 90 and 180 degrees. FIG. 1b shows an example of a punch where the included angle for the cupped portion of the surface of the punch head is between about 115 degrees and about 120 degrees. As shown in FIG. 1b, the depth 135 of the cupped volume 130 is less than the diameter of the edge 105 that defines the cupped volume 130.

FIG. 2 shows an example of a unified tool for forming an aperture in a layer of an article, injecting a fluid into a volume within the article, and sealing the article to substantially retain the fluid within the volume. In FIG. 2, punch head 201 is part of punch 205. At least a portion of punch 205 (including punch head 201) resides within a tube or conduit 212. Optionally, the axis of the punch 205 can be concentric with the axis of the conduit 212.

In a first position, the punch 205 can reside within a conduit or tube, such as conduit 212 as shown in FIG. 2. As shown in FIG. 2, both the inner perimeter and outer perimeter of the conduit 212 can vary along the height of the conduit. The bottom or end surface 215 of the conduit can extend past the punch in the first position. During operation of the tool the punch can be deployed past the bottom surface of the tube in order to form an aperture. The maximum length of deployment for the punch can define a second position. Optionally, the length of deployment for the punch can be adjustable, such as by mechanically coupling the punch to an actuator via a threaded screw coupling. The first position and/or the second position for the punch can then be adjusted by modifying the location of the mechanical coupling relative to the screw coupling.

Conduit 212 is mounted on or otherwise coupled to a primary structure or base 220. Base 220 also includes a cylinder 230 that is coupled to punch 205. In the example shown in FIG. 2, the actuator for the punch 205 corresponds to a single acting pneumatic cylinder. In FIG. 2, punch 205 is coupled to cylinder 230 via a screw mechanism. The screw mechanism can be used to adjust the height of the punch 205 relative to the tube 212. A height adjustment for punch 205 can be based on a desired height at the rest position, a desired length of deployment for the punch head 201 beyond end surface 215 of conduit 212, or the height can be adjusted for any another convenient reason. Pressure to move the cylinder 230 along the axis is motion can be provided from a fluid source (not shown) via fluid conduit 242. The cylinder 230 of the actuator is positioned to work in conjunction with spring mechanism 235, which can provide the force to return the cylinder to a first (starting) position after the pressure above the cylinder head is released. The first position for cylinder 230 can correspond to a natural length or rest length for the spring mechanism 235, or the first position can be defined by a mechanical stop so that the cylinder 230 is biased against the mechanical stop by the spring 235. When the cylinder 230 is moved to compress the spring mechanism 235, the punch 201 is moved relative to the tube 212. This allows the punch 201 to be deployed beyond the end surface 215 of tube 212.

During operation to form an aperture in a polymer layer of an article, end surface 215 of conduit 212 can be contacted with the surface of the article. The end surface 215 can form a sufficient seal with the surface of the article to maintain a pressure greater than the surrounding atmosphere within the interior of conduit 212. The interior volume can be pressurized based on a gas flow passed around the exterior of punch 205 in tube 212. In FIG. 2, the gas flow is introduced via a second fluid conduit 247, which is in fluid communication with a second fluid source (not shown).

Punch 205 can then be deployed to form an aperture in the surface. Due to the cupped nature of the tip 202 of punch head 201, the remnant material of the plastic layer that is created when the aperture is formed can remain with the plastic layer. After forming the aperture, the punch 205 is withdrawn (such as due to the restoring force provided by spring 235). The pressurized fluid within conduit 212 can be used to fill or at least partially fill a chamber in the plastic article. The amount of pressurized fluid injected into the chamber can depend on the pressure of the fluid within conduit 212.

After injecting fluid into the chamber, the end surface 215 of conduit 212 can be pressed onto the surface of the polymer layer with additional force to allow for RF welding. This can allow a seal to form around the aperture so that the injected fluid is substantially retained within the chamber of the plastic article.

Figure 3A:
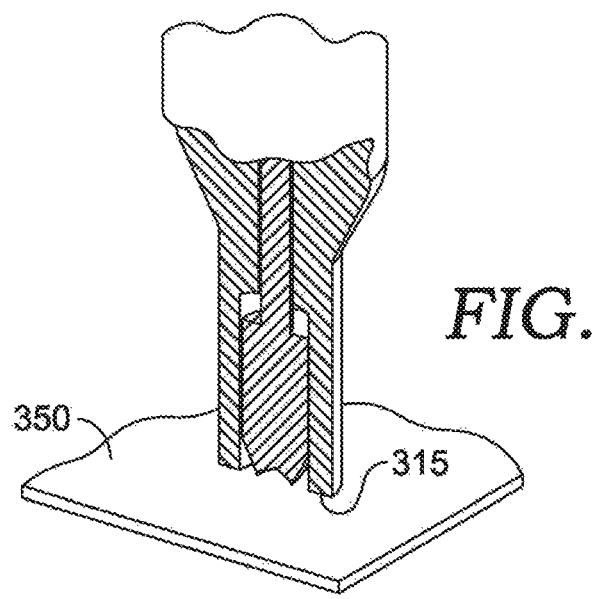
FIGS. 3a-3b shows examples of variations in the position of a tool for forming an aperture in a surface according to an of the disclosure.
Figure 3B:
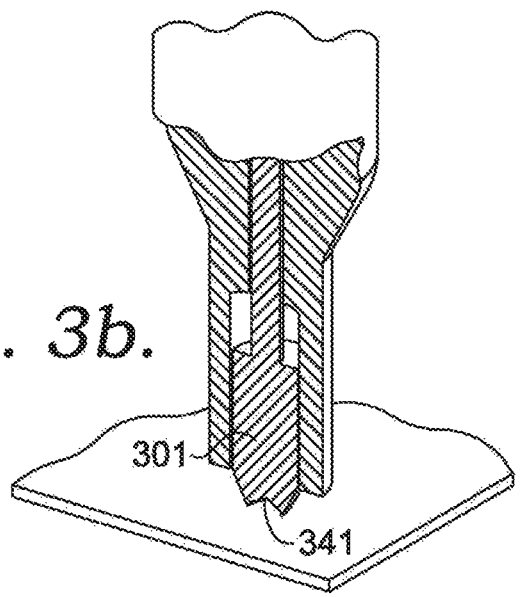

FIGS. 3a and 3b show an example of deploying a punch to form an aperture in a layer of an article. In FIGS. 3a and 3b, the end surface 315 of the tool is shown separated from the top of layer 350 for ease of viewing. It is understood that during formation of an aperture, end surface 315 will typically be in contact with layer 350. When end surface 315 is initially brought into contact with layer 350, the punch head 301 can be in a first position corresponding to FIG. 3a. This first position can be used to form a seal between end surface 315 and layer 350. The punch head 301 can then be deployed to a position such as the position shown in FIG. 3b. This position can cause an aperture to be formed in layer 350. In some aspects, the depth of the cupped surface 341 of punch head 301 is sufficient to allow the aperture to form in layer 350 while allowing the material originally occupying the aperture location to remain with layer 350.

Example of Inflation: Chamber in Sole of Article of Footwear

One application for unified punch and inflation tool is for inflation of a chamber in the sole of an article of footwear. After forming the sole for a shoe (or other footwear), such as by a molding process, a chamber within the sole can be inflated to improve one or more characteristics of the sole and/or footwear. FIGS. 4-10D show an example configuration for an article of footwear with a chamber that can be inflated. Of course, other types of articles of footwear with other locations for inflation of a chamber may also be inflated using a tool as described herein.

Figure 4:
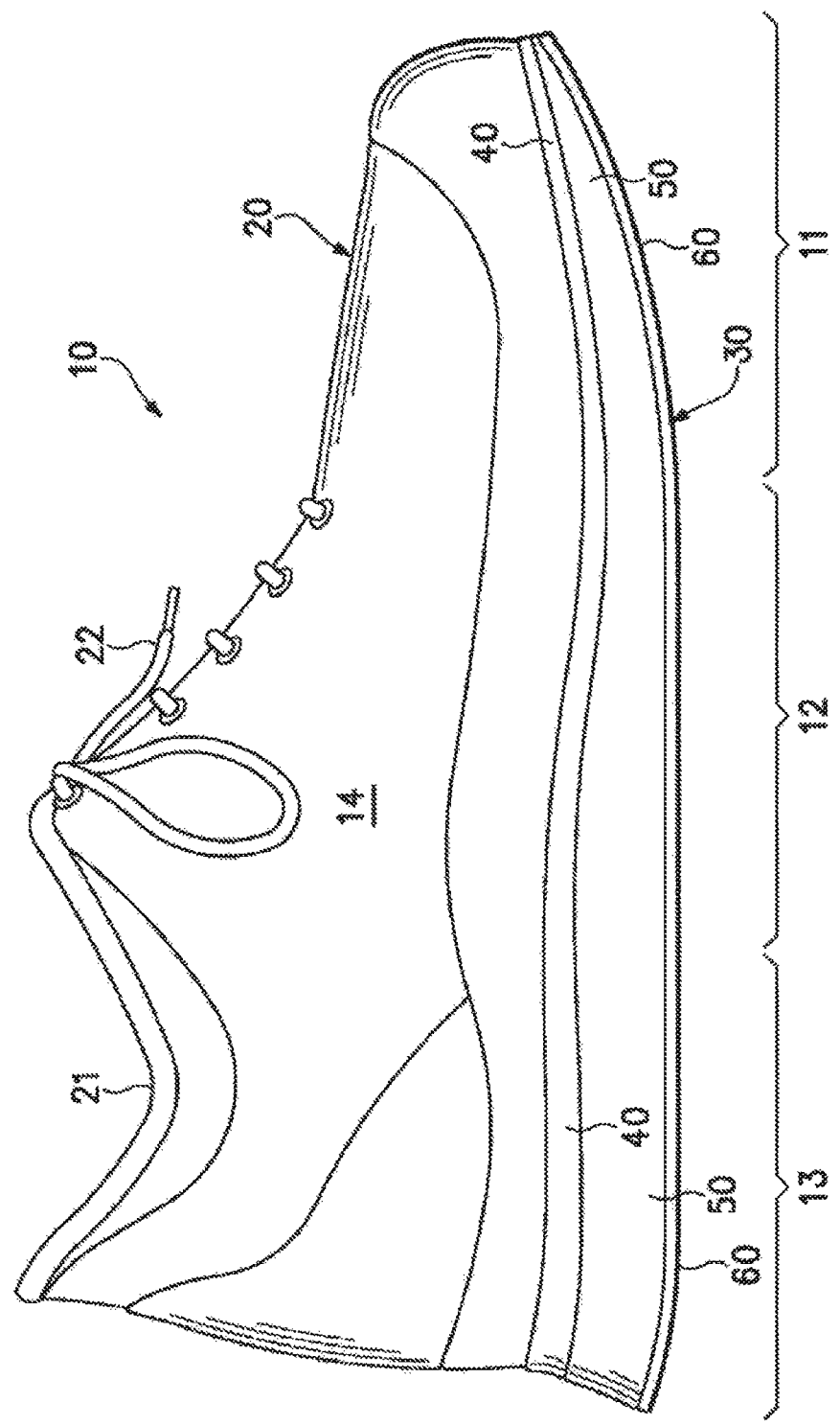
FIG. 4 is a lateral side elevational view of an article of footwear.
Figure 5:
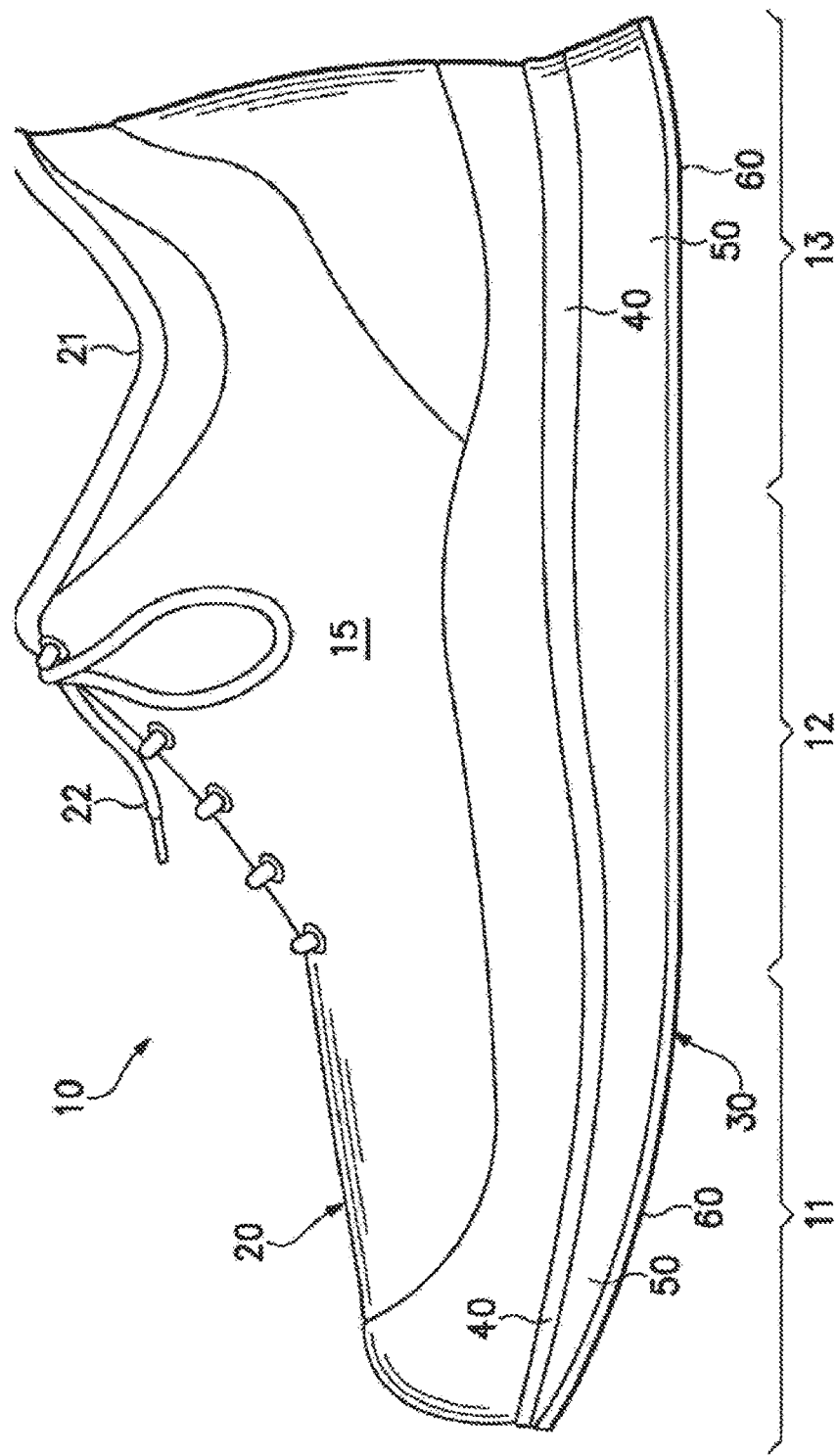
FIG. 5 is a medial side elevational view of the article of footwear.

An article of footwear 10 is depicted in FIGS. 4 and 5 as including an upper 20 and a sole structure 30. For reference purposes, footwear 10 may be divided into three general regions: a forefoot region 11, a midfoot region 12, and a heel region 13, as shown in FIGS. 4 and 5. Footwear 10 also includes a lateral side 14 and a medial side 15. Forefoot region 11 generally includes portions of footwear 10 corresponding with the toes and the joints connecting the metatarsals with the phalanges. Midfoot region 12 generally includes portions of footwear 10 corresponding with the arch area of the foot, and heel region 13 corresponds with rear portions of the foot, including the calcaneus bone. Lateral side 14 and medial side 15 extend through each of regions 11-13 and correspond with opposite sides of footwear 10. Regions 11-13 and sides 14-15 are not intended to demarcate precise areas of footwear 10. Rather, regions 11-13 and sides 14-15 are intended to represent general areas of footwear 10 to aid in the following discussion. In addition to footwear 10, regions 11-13 and sides 14-15 may also be applied to upper 20, sole structure 30, and individual elements thereof.

Upper 20 is depicted as having a substantially conventional configuration incorporating a plurality material elements (e.g., textile, foam, leather, and synthetic leather) that are stitched or adhesively bonded together to form an interior void for securely and comfortably receiving a foot. The material elements may be selected and located with respect to upper 20 in order to selectively impart properties of durability, air-permeability, wear-resistance, flexibility, and comfort, for example. An ankle opening 21 in heel region 13 provides access to the interior void. In addition, upper 20 may include a lace 22 that is utilized in a conventional manner to modify the dimensions of the interior void, thereby securing the foot within the interior void and facilitating entry and removal of the foot from the interior void. Lace 22 may extend through apertures in upper 20, and a tongue portion of upper 20 may extend between the interior void and lace 22. Given that various aspects of the present application primarily relate to sole structure 30, upper 20 may exhibit the general configuration discussed above or the general configuration of practically any other conventional or non-conventional upper. Accordingly, the overall structure of upper 20 may vary significantly.

Figure 6:
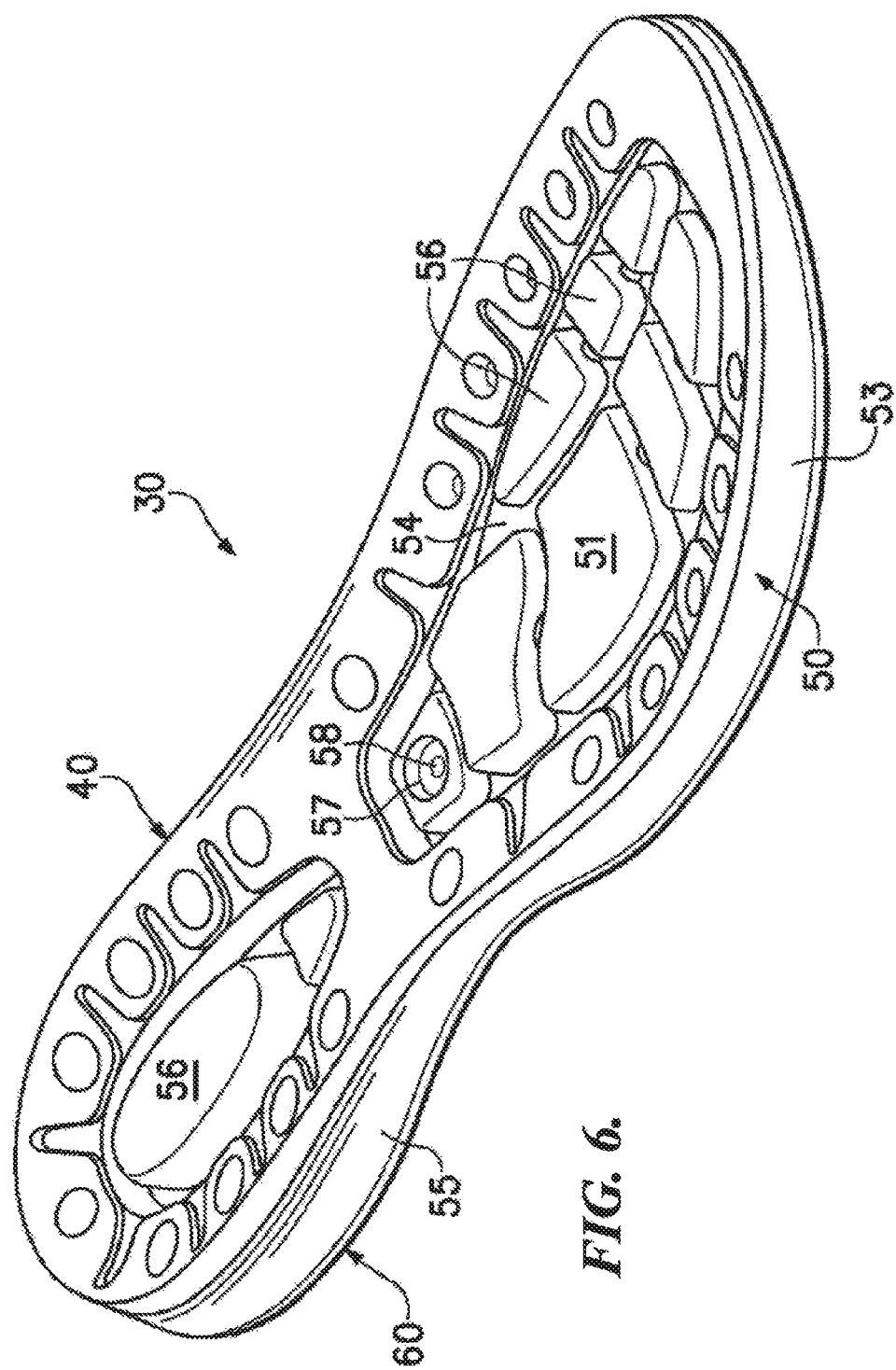
FIG. 6 is a perspective view of a sole structure of an article of footwear.
Figure 7:
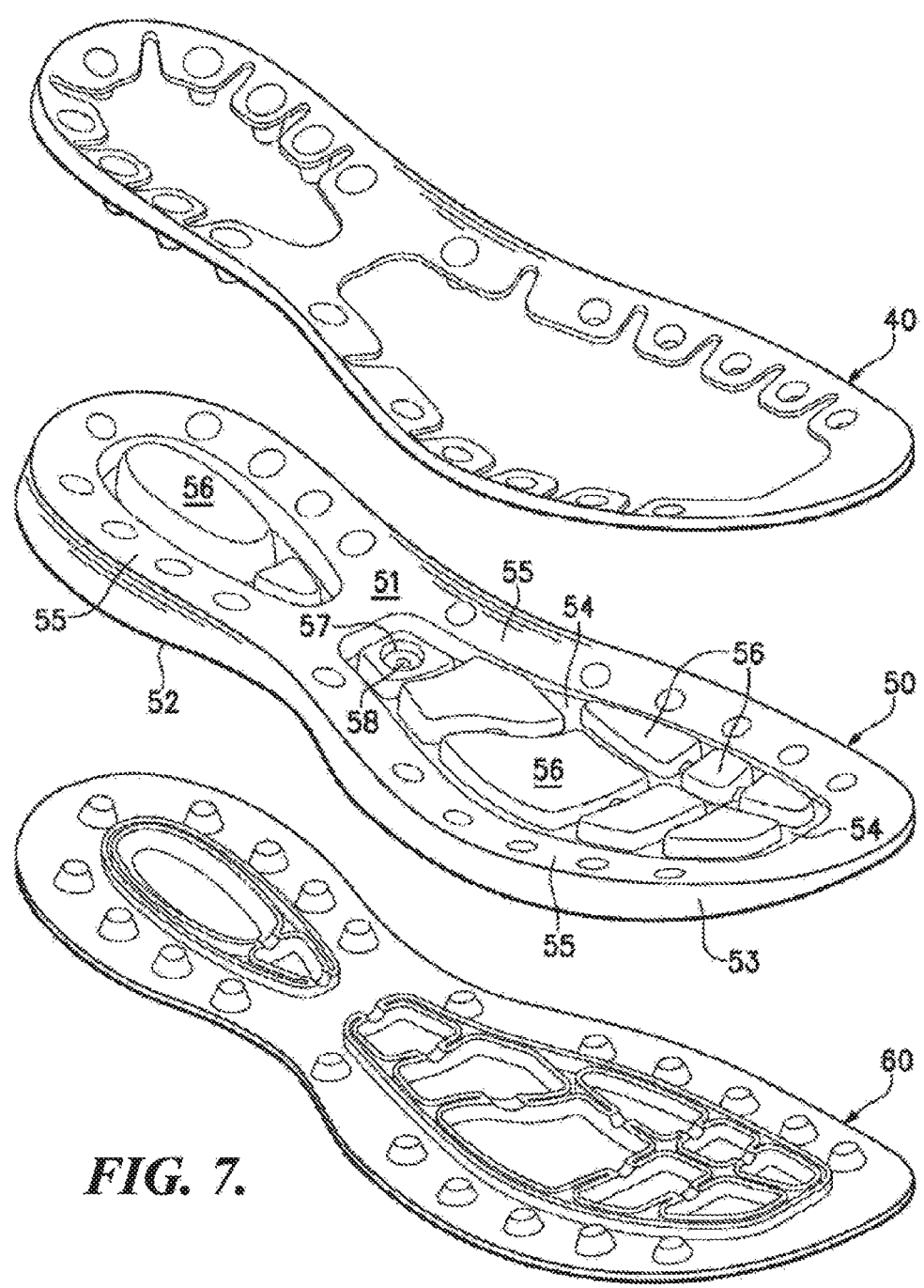
FIG. 7 is an exploded perspective view of the sole structure.
Figure 8:
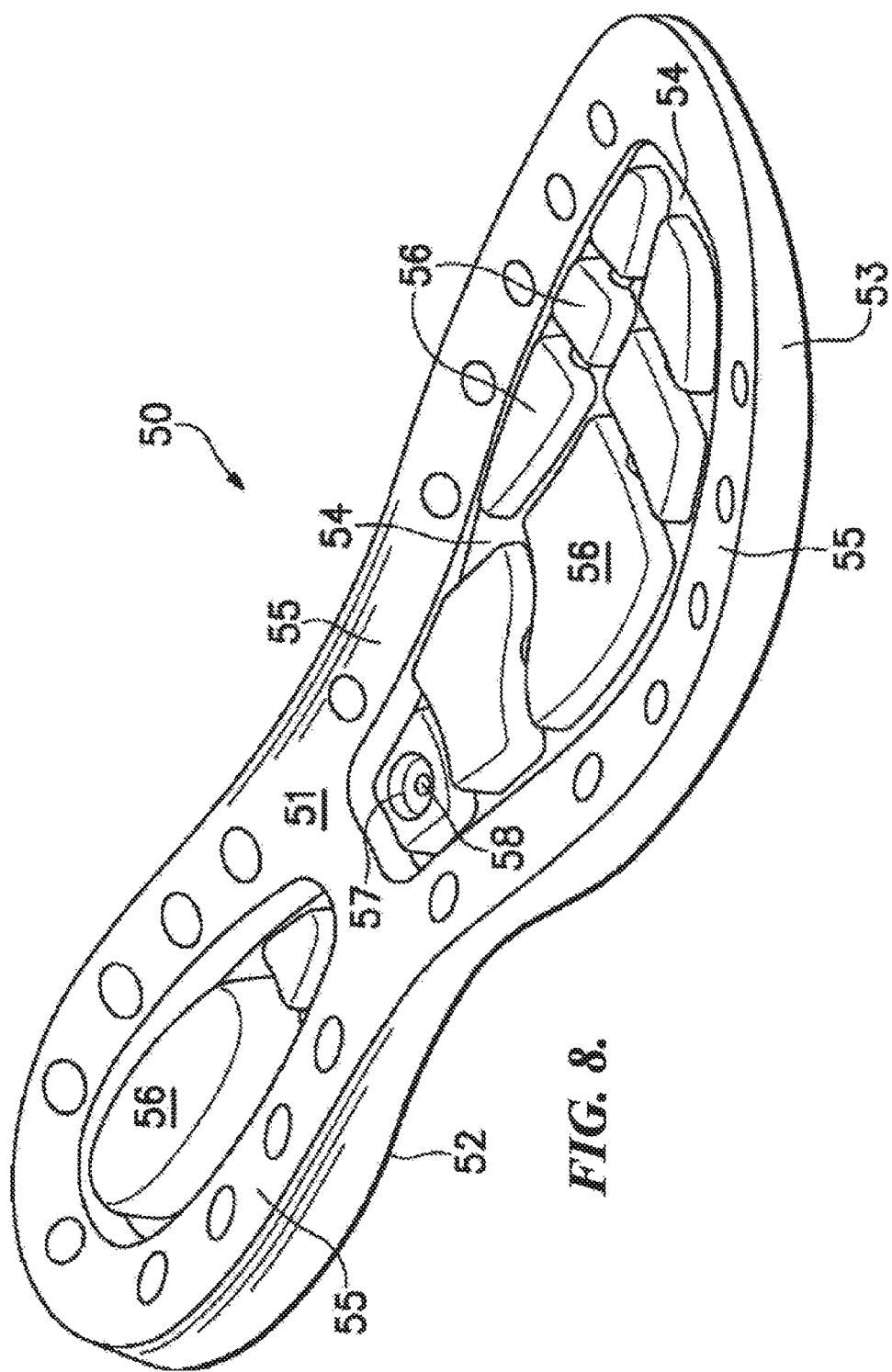
FIG. 8 is a perspective view of a fluid-filled chamber of the sole structure.
Figure 9:
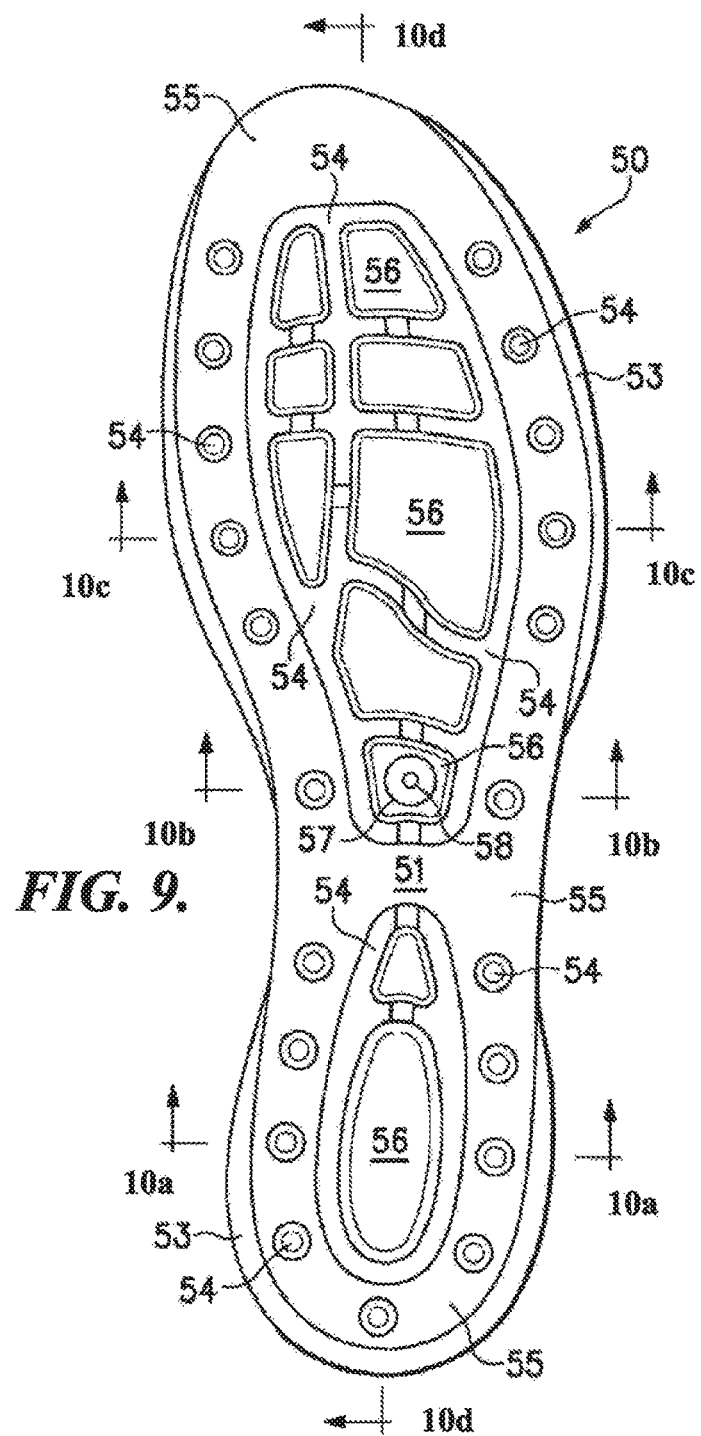
FIG. 9 is a top plan view of the chamber.
Figure 10A:
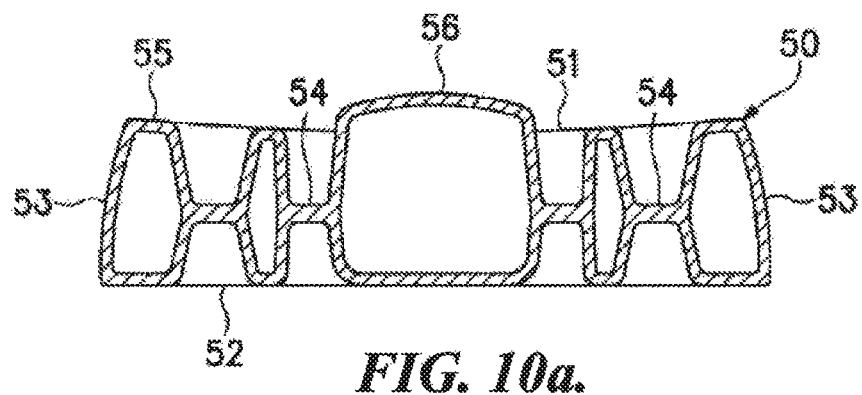
FIGS. 10a-10d are cross-sectional views of the chamber, as defined by section lines 10a-10d in FIG. 9.
Figure 10B:
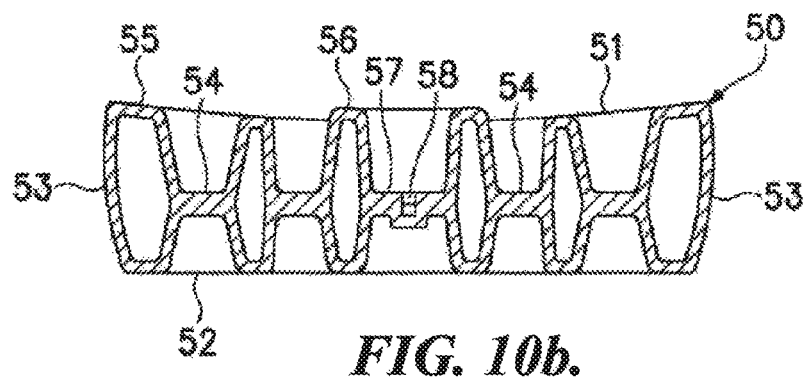
Figure 10C:
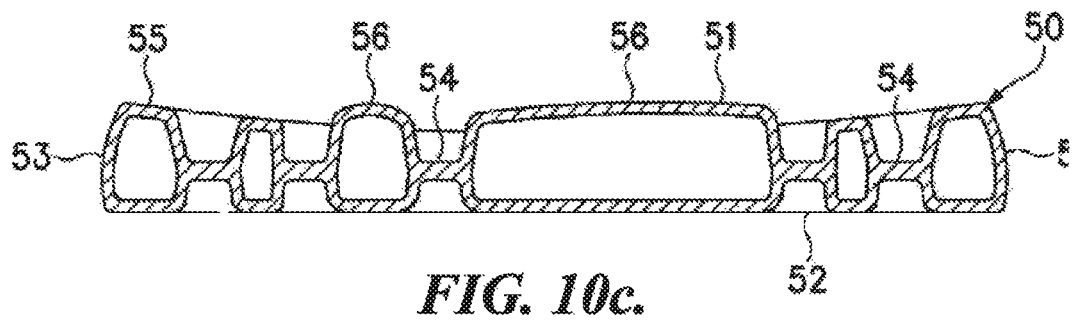
Figure 10D:
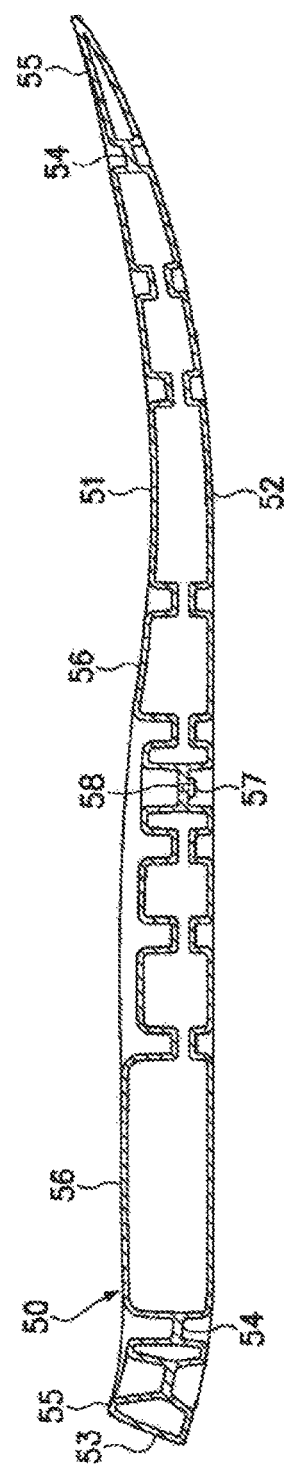

Sole structure 30 is secured to upper 20 and has a configuration that extends between upper 20 and the ground. In effect, therefore, sole structure 30 is located to extend between the foot and the ground. In addition to attenuating ground reaction forces (i.e., providing cushioning for the foot), sole structure 30 may provide traction, impart stability, and limit various foot motions, such as pronation. The primary elements of sole structure 30 are a plate 40, a chamber 50, and an outsole 60, as depicted in FIGS. 6 and 7. Plate 40 forms an upper portion of sole structure 30 and is positioned adjacent to upper 20. Chamber 50 forms a middle portion of sole structure 30 and is positioned between plate 40 and outsole 60. In addition, outsole 60 forms a lower portion of sole structure 30 and is positioned to engage the ground. Each of plate 40, chamber 50, and outsole 60 extend around a perimeter of sole structure 30 and have a shape that generally corresponds with an outline of the foot. More particularly, plate 40, chamber 50, and outsole 60 extend from forefoot region 11 to heel region 13 and also from lateral side 14 to medial side 15. Accordingly, each of plate 40, chamber 50, and outsole 60 are exposed to an exterior of footwear 10 and cooperatively form a side surface of sole structure 30.

Chamber 50, which is depicted individually in FIGS. 8-10D, is formed from a polymer material that provides a sealed barrier for enclosing a fluid. The polymer material defines an upper surface 51, an opposite lower surface 52, and a sidewall surface 53 that extends around a periphery of chamber 50 and between surfaces 51 and 52. As discussed above, chamber 50 has a shape that generally corresponds with an outline of the foot. As with plate 40 and outsole 60, chamber 50 is exposed to an exterior of footwear 10 and forms a portion of the side surface of sole structure 30. More particularly, sidewall surface 53 is exposed to the exterior of footwear 10 around substantially all of the side surface of sole structure 30.

Chamber 50 includes various bonded areas 54 where upper surface 51 is bonded or otherwise joined to lower surface 52. In general, bonded areas 54 are spaced inward from sidewall surface 53 and form various depressions or indentations in each of surfaces 51 and 52. Some of the depressions in upper surface 51 are shaped to receive various projections that extend downward from plate 40. That is, the projections of plate 40 extend into the depressions formed by portions of bonded areas 54. Similarly, some of the depressions in lower surface 52 are shaped to receive various projections that extend upward from outsole 60. That is, the projections of outsole 60 also extend into the depressions formed by portions of bonded areas 54.

Bonded areas 54 also form various subchambers within chamber 50. For example, a peripheral subchamber 55 extends around the periphery of chamber 50 and a plurality of interior subchambers 56 are centrally-located in chamber 50. Various conduits may connect subchambers 55 and 56 such that the fluid within chamber 50 may pass between subchambers 55 and 56. In some configurations, the conduits may be absent or sealed to prevent fluid transfer between subchambers 55 and 56. When the conduits are absent or sealed, the fluid within subchambers 55 and 56 may be pressurized to different degrees.

In addition to bonded areas 54, an inflation area 57 has a configuration wherein upper surface 51 is bonded or otherwise joined to lower surface 52. Inflation area 57 is spaced inward from sidewall surface 53. More particularly, inflation area 57 is located in midfoot region 12, centered between sides 14 and 15, and extends through a center of one of interior subchambers 56. As described in greater detail below, chamber 50 is inflated through inflation area 57 and has the advantages of (a) imparting a clean, relatively unbroken appearance to sidewall surface 53, (b) reducing the quantity of residual polymer material produced during the manufacturing process, and (c) decreasing the size of a mold that is utilized during the manufacturing process.

A variety of polymer materials may be utilized for chamber 50. In selecting a polymer material for chamber 50, engineering properties of the polymer material (e.g., tensile strength, stretch properties, fatigue characteristics, dynamic modulus, and loss tangent) as well as the ability of the material to limit the diffusion of the fluid contained by chamber 50 may be considered. When formed of thermoplastic urethane, for example, the polymer material of chamber 50 may have a thickness of approximately 0.89 millimeter, but the thickness may range from 0.25 to 4.0 millimeters or more, for example. In addition to thermoplastic urethane, examples of polymer materials that may be suitable for chamber 50 include polyurethane, polyester, polyester polyurethane, polyether polyurethane, and polyurethane including a polyester polyol. Accordingly, a variety of polymer materials may be utilized for chamber 50.

In manufacturing chamber 50, both a molding process and an inflation process are utilized. The molding process involves shaping a polymer material to define the general configuration of chamber 50. More particularly, the molding process includes shaping the polymer material to form surfaces 51-53 and also form bonded areas 54 to define subchambers 55 and 56. Although not performed during some molding processes, a portion of inflation area 57 may also be formed or otherwise defined. Once the molding process is complete, an inflation process as described above can be utilized to pressurize and seal chamber 50.

In this description, reference is made to combinations involving "any of" a number of embodiments, aspects, and/or claims. The term "any of" is understood to include any possible combination of at least one of the embodiments, aspects, and/or claims in the recited range, including "any one of".

The description above and the accompanying figures provide a variety of configurations. The purpose served by the disclosure is to provide an example of various features and concepts. One skilled in the relevant art will recognize that numerous variations and modifications may be made to the configurations described above without departing from the scope of the present disclosure, as defined by the appended claims.

What is claimed is:

1. A method for introducing fluid into a sealed volume, comprising:
   contacting a first layer of an article with a pressurization conduit, the pressurization conduit having an inner perimeter and an outer perimeter, the inner perimeter defining a conduit volume;
   forming an aperture in the first layer of the article with a punch, at least a portion of the punch being within the conduit volume, the conduit volume being in fluid communication with a first volume in the article via the aperture in the first layer;
   injecting one or more fluids from the conduit volume into the first volume via the aperture in the first layer to generate a first pressure;
   compressing, using the pressurization conduit, at least a portion of the first layer of the article against at least a portion of the second layer of the article; and
   forming a bond between the first layer of the article and a second layer of the article, the bond being formed around the aperture in the first layer, wherein the punch comprises a punch head having a single opening, the punch head comprising a punch edge defining a perimeter of the single opening, a surface of the punch within the perimeter being cupped and defining a punch volume, an average depth of the punch volume being less than a thickness of the first layer.

2. The method of claim 1, wherein contact is maintained between the pressurization conduit and the first layer from forming the aperture in the first layer to forming the bond around the aperture in the first layer.

3. The method of claim 1, further comprising introducing at least one fluid into the conduit volume prior to forming the aperture in the first layer to generate a conduit pressure.

4. The method of claim 3, wherein the aperture in the first layer is formed in a portion of the first layer exposed to the conduit pressure, the conduit pressure being maintained on the portion of the first layer exposed to the conduit pressure from forming the aperture in the first layer to forming the bond around the aperture in the first layer.

5. The method of claim 3, wherein introducing the at least one fluid into the conduit volume comprises introducing a fluid into the conduit volume to generate an intermediate pressure, forming a seal between the conduit and the first layer, and introducing a fluid to generate the conduit pressure.

6. The method of claim 3, wherein the conduit pressure is greater than a pressure outside of the pressurization conduit by about 3 psi (20.7 kPa) to about 100 psi (690 kPa).

7. The method of claim 3, wherein the conduit pressure is continuously greater than a pressure outside of the pressurization conduit by about 3 psi (20.7 kPa) to about 100 psi (690 kPa) from the forming of the aperture in the first layer to the forming of the bond around the aperture.

8. The method of claim 3, wherein at least a portion of the first layer is continuously exposed to the conduit pressure from the forming of the aperture in the first layer to the forming of the bond around the aperture, the conduit pressure being greater than a pressure outside of the pressurization conduit and a pressure outside of the fluid-receiving volume by about 3 psi (20.7 kPa) to about 100 psi (690 kPa).

9. The method of claim 1, wherein the punch volume is a conical volume, a conical frustum volume, an n-sided pyramidal volume where n is greater than or equal to three, or a frustum volume based on an n-sided pyramidal volume where n is greater than or equal to three.

10. The method of claim 1, wherein an included angle at opposing points of the perimeter of the punch is about 120° to 160°.

11. The method of claim 1, wherein the average depth of the punch volume is about 0.2 to about 0.75 times an average diameter of the perimeter of the punch edge.

12. The method of claim 1, wherein during the forming of the bond around the aperture in the first layer, the aperture in the first layer is adjacent to a portion of the second layer that does not include an aperture.

13. The method of claim 1, wherein the pressurization conduit comprises an electrode, and wherein forming the bond around the aperture comprises forming the bond with radio frequency energy.

14. The method of claim 1, wherein the first layer comprises a thermoplastic polymer, a thermoplastic urethane, a polyurethane, a polyester, a polyester polyurethane, a polyether polyurethane, a polyester polyol, or a combination thereof.

15. The method of claim 1, wherein the second layer is a thermoplastic polymer, a thermoplastic urethane, a polyurethane, a polyester, a polyester polyurethane, a polyether polyurethane, a polyester polyol, or a combination thereof.

16. The method of claim 1, wherein the conduit pressure is about 18 psia (124 kPaa) to about 115 psia (793 kPaa).

17. The method of claim 1, wherein the first pressure is from about 14.5 psia (100 kPaa) to about 51 psia (350 kPaa).

18. The method of claim 1, wherein the pressure within the first volume after forming the bond around the aperture is about 18 psia (124 kPaa) to about 115 psia (793 kPaa).

* * * * *